(12) United States Patent
Grendon et al.

(10) Patent No.: US 11,715,099 B2
(45) Date of Patent: Aug. 1, 2023

(54) METHOD AND SYSTEM FOR TRUST-BASED PAYMENTS VIA BLOCKCHAIN

(71) Applicant: Mastercard International Incorporated, Purchase, NY (US)

(72) Inventors: Lauren Grendon, Dublin (IE); Mamadou Alpha Barry, Dublin (IE); Edgar Marques, Dublin (IE); Julie Eloge Eboutou, Wicklow (IE); Valerie Gann, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 196 days.

(21) Appl. No.: 15/848,089

(22) Filed: Dec. 20, 2017

(65) Prior Publication Data

US 2019/0188704 A1 Jun. 20, 2019

(51) Int. Cl.
*G06Q 20/38* (2012.01)
*H04L 9/32* (2006.01)
(Continued)

(52) U.S. Cl.
CPC ....... *G06Q 20/38215* (2013.01); *G06Q 20/02* (2013.01); *G06Q 20/223* (2013.01);
(Continued)

(58) Field of Classification Search
CPC ............. G06Q 20/38215; G06Q 20/02; G06Q 20/322; G06Q 20/223; G06Q 20/3674;
(Continued)

(56) References Cited

U.S. PATENT DOCUMENTS 10,410,209 B2 * 9/2019 Boyle .................... G06Q 20/02
2011/0208600 A1 8/2011 Aharoni et al.
(Continued)

FOREIGN PATENT DOCUMENTS

CN 107169371 A * 9/2017 .......... G06F 21/602
CN 107169371 A 9/2017
(Continued)

OTHER PUBLICATIONS

"VSK Chains: Integrated Content and Currency Transaction Blockchains", 2017 23rd Annual Conference on Advanced Computing and Communications, Sep. 1, 2017 (Year: 2017).*
(Continued)

*Primary Examiner* — Neha Patel
*Assistant Examiner* — Duan Zhang
(74) *Attorney, Agent, or Firm* — Panitch Schwarze Belisario & Nadel LLP (57) ABSTRACT

A method for processing a trust-based transaction via a blockchain includes: receiving data associated with a proposed trust-based transaction including at least a transaction amount, payment data, and a broker identifier; processing payment for the transaction amount using the payment data; identifying a blockchain address associated with a broker corresponding to the broker identifier; generating a digital token, wherein the digital token is unique to the proposed trust-based transaction; electronically transmitting the generated digital token to a first computing device; and electronically transmitting at least the transaction amount, blockchain address, and at least one of: the generated digital token and data used to generate the generated digital token to a node associated with a blockchain network.

20 Claims, 6 Drawing Sheets

(51) Int. Cl.
*H04L 9/06* (2006.01)
*G06Q 20/02* (2012.01)
*G06Q 20/32* (2012.01)
*G06Q 20/22* (2012.01)
*G06Q 20/36* (2012.01)

(52) U.S. Cl.
CPC ....... *G06Q 20/322* (2013.01); *G06Q 20/3674* (2013.01); *G06Q 20/3676* (2013.01); *G06Q 20/389* (2013.01); *G06Q 20/3825* (2013.01); *G06Q 20/3827* (2013.01); *G06Q 20/3829* (2013.01); *H04L 9/0637* (2013.01); *H04L 9/3213* (2013.01); *H04L 9/3226* (2013.01); *H04L 9/3297* (2013.01)

(58) Field of Classification Search
CPC ............. G06Q 20/3676; G06Q 20/389; G06Q 20/3825; G06Q 20/3827; G06Q 20/3829; H04L 9/0637; H04L 9/3297; H04L 9/3213; H04L 9/3226
See application file for complete search history.

(56) References Cited

U.S. PATENT DOCUMENTS

| | | | |
|---|---|---|---|
| 2012/0066749 A1* | 3/2012 | Taugbol | G06F 21/35 726/6 |
| 2012/0290376 A1* | 11/2012 | Dryer | G06Q 20/385 705/14.23 |
| 2015/0032627 A1* | 1/2015 | Dill | H04L 9/32 705/44 |
| 2015/0302398 A1* | 10/2015 | Desai | G06Q 20/40 705/41 |
| 2016/0086166 A1* | 3/2016 | Pomeroy | G06Q 20/36 705/40 |
| 2016/0092872 A1* | 3/2016 | Prakash | G06Q 20/322 705/65 |
| 2016/0342978 A1* | 11/2016 | Davis | G06Q 20/38215 |
| 2017/0109735 A1* | 4/2017 | Sheng | H04L 9/3247 |
| 2017/0132625 A1 | 5/2017 | Kennedy | |
| 2017/0177898 A1 | 6/2017 | Dillenberger | |
| 2017/0357966 A1* | 12/2017 | Chandrasekhar | G06Q 20/3829 |
| 2018/0247302 A1* | 8/2018 | Armstrong | G06Q 20/389 |
| 2020/0007316 A1* | 1/2020 | Krishnamacharya | H04L 9/0637 |
| 2020/0013054 A1* | 1/2020 | Upadhye | G07F 7/1008 |

FOREIGN PATENT DOCUMENTS

| | | |
|---|---|---|
| WO | 2017006256 A1 | 1/2017 |
| WO | 2017027900 A1 | 2/2017 |

OTHER PUBLICATIONS

Notification of Transmittal of the International Search Report and the Written Opinion of the International Searching Authority (Forms PCT/ISA/220, PCT/ISA/210 and PCT/ISA/237) dated Feb. 14, 2019, by the European Patent Office in corresponding International Application No. PCT/US2018/06177. (10 pages).

Notification of the First Office Action, dated Nov. 24, 2022, issued by China National Intellectual Propery Administration in corresponding CN Application No. 201811559189.2, and attached Search Report, 17 pps.

* cited by examiner

METHOD AND SYSTEM FOR TRUST-BASED PAYMENTS VIA BLOCKCHAIN

FIELD

The present disclosure relates to the processing of trust-based transactions via a blockchain, specifically the implementation of trust-based systems, such as Hawala, via blockchain to provide for increased security, reliability, speed, and recordation of payments and other transactions.

BACKGROUND

Hawala (a payment system based on the performance and honor of a network of money brokers) and other trust-based payment systems have been around for centuries, providing for reliable, fast, and secure ways of making payments and money transfers across long distances. Traditionally, trust-based payment systems are operated through brokers and passwords or other similar types of security. A first person wanting to transfer money to a second person will pay a first broker and provide the first broker with a password. The first broker tells a second broker the password and the amount being transferred. The first person tells the second person the password, and the second person goes to the second broker (e.g., in their current area, which may be significantly far away from the first person, or may be done after an elapsed period of time) and provides the password. The second broker, verifying that the password is correct, pays the second person the amount being transferred. Thus, money is transferred without anything actually being exchanged by any parties but the password, which can be done orally, via telephone, via e-mail, or any other suitable method.

In trust-based systems, brokers will receive and pay out money to customers for transfers without performing immediately settlement between other brokers or providing any consideration at all, as the transactions performed on an honor system, hence being referred to as a "trust-based" payment system. Debts between brokers are often settled after significant periods of time, if ever, with balances being updated as new trust-based transactions take place. If a broker ever cheats or otherwise breaks the honor of the system, they are typically ex-communicated from the system, and sometimes worse (e.g., out of families, clans, villages, etc.), providing for sufficient penalties for many to adhere to the honor system for the trust-based network.

However, while the honor system is often suitable to ensure legitimate participation of brokers in a trust-based system, these systems are often exposed to potential compromise in the transfer of passwords or other security values. For instance, a nefarious actor could overhear an oral delivery of the password, intercept the password if it is sent via e-mail or short messaging service message, or otherwise gain access to the password during either transmission (e.g., between customers or between brokers). The nefarious actor could then deliver the second password and effectively steal the payment intended for the second party. Thus, there is a need for a technological solution to increase the security and reliability of a trust-based system, while still maintaining the benefits of the use of brokers and the honor system that has made trust-based systems useful for centuries.

SUMMARY

The present disclosure provides a description of systems and methods for processing trust-based transactions using a blockchain. When a new trust-based transaction is started, a digital token is generated where the token or data used to generate the token is stored in the blockchain. The digital token, or data used to generate the token, is encrypted and exchanged between customers and brokers, where only the second customer and second broker, as authorized parties, are able to decrypt and generate the correct digital token. The digital token is delivered to the second broker by the second party, which compares the delivered token with its own digital token, as well as comparing it with the token on or based on the blockchain, to ensure that the intended recipient is the only one able to receive the transferred money from the second broker. Thus, the trust-based system is maintained where the use of a digital token and the blockchain provides for significantly greater security.

A method for processing a trust-based transaction via a blockchain includes: receiving, by a receiving device of a processing server, data associated with a proposed trust-based transaction including at least a transaction amount, payment data, and a broker identifier; processing, by a transaction processing module of the processing server, payment for the transaction amount using the payment data; identifying, by a data identification module of the processing server, a blockchain address associated with a broker corresponding to the broker identifier; generating, by a generation module of the processing server, a digital token, wherein the digital token is unique to the proposed trust-based transaction; electronically transmitting, by a transmitting device of the processing server, the generated digital token to a first computing device; and electronically transmitting, by the transmitting device of the processing server, at least the transaction amount, blockchain address, and at least one of: the generated digital token and data used to generate the generated digital token to a node associated with a blockchain network.

A system for processing a trust-based transaction via a blockchain includes: a receiving device of a processing server configured to receive data associated with a proposed trust-based transaction including at least a transaction amount, payment data, and a broker identifier; a transaction processing module of the processing server configured to process payment for the transaction amount using the payment data; a data identification module of the processing server configured to identify a blockchain address associated with a broker corresponding to the broker identifier; a generation module of the processing server configured to generate a digital token, wherein the digital token is unique to the proposed trust-based transaction; and a transmitting device of the processing server configured to electronically transmit the generated digital token to a first computing device, and electronically transmit at least the transaction amount, blockchain address, and at least one of: the generated digital token and data used to generate the generated digital token to a node associated with a blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Processing Trust-Based Payments via Blockchain

Figure 1:
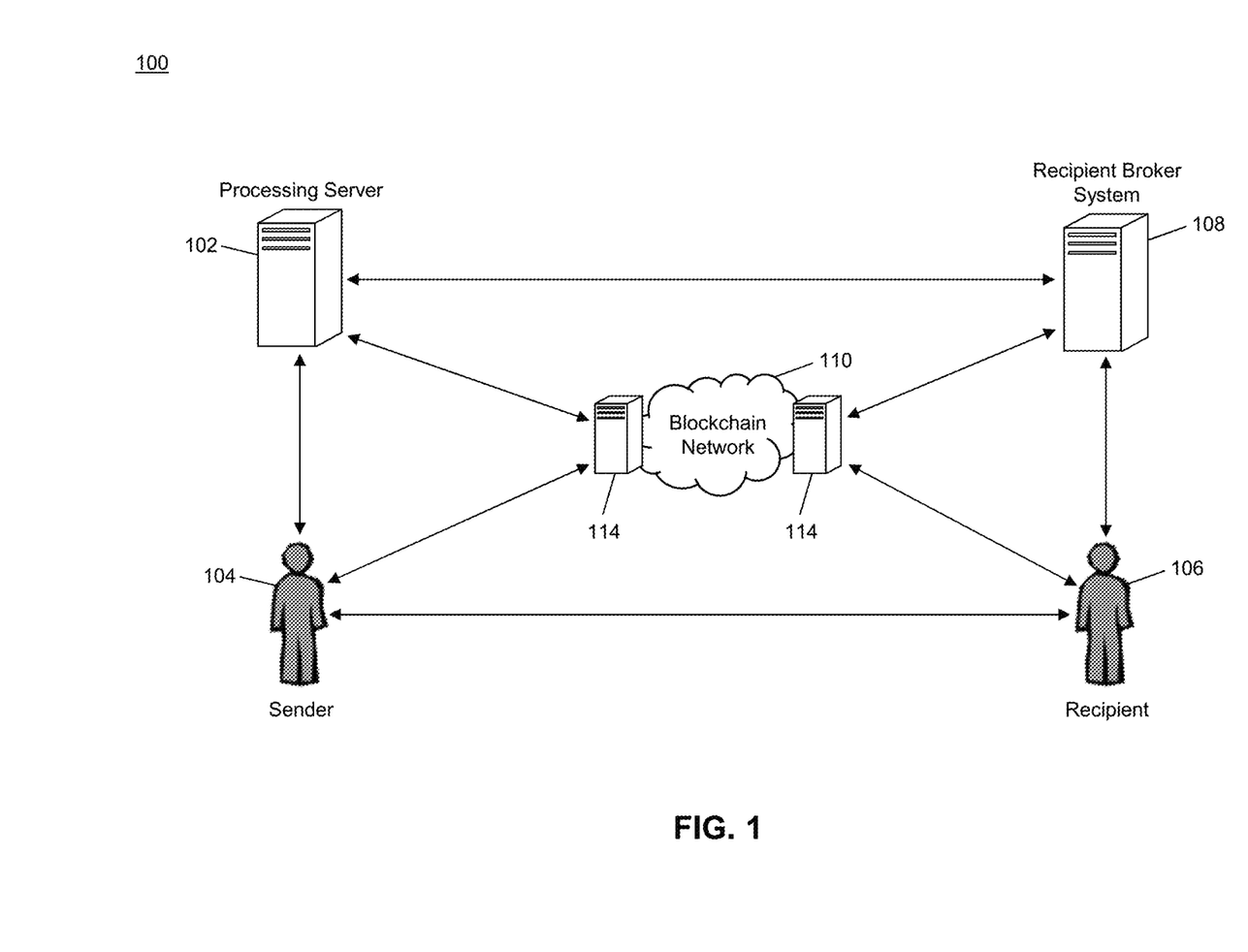
FIG. 1 is a block diagram illustrating a high level system architecture for implementing a trust-based system using blockchain in accordance with exemplary embodiments.

FIG. 1 illustrates a system 100 for processing trust-based payments using a blockchain, where a digital token is used in place of a password and a copy of the digital token, or data used in the generation thereof, is stored on a blockchain to provide for an additional layer of security in verification of an intended recipient of a trust-based payment.

The system 100 may include a processing server 102. The processing server 102, discussed in more detail below, may be a computing system specifically configured to perform the functions discussed herein. In the embodiment illustrated in FIG. 1, the processing server 102 may be situated at, or otherwise used by or interacted with, the first broker in a trust-based system. As any broker in a trust-based system may both accept and distribute funds, the processing server 102 may be configured to perform the functions of both a sender broker and a recipient broker with respect to the systems and methods as discussed herein.

In the system 100, a sender 104 may want to transfer an amount of currency to a recipient 106 using a trust-based system. The sender 104 may visit a first broker, which may use the processing server 102. In some embodiments, the first broker may be the processing server 102 itself, where the processing server 102 may have input devices interfaced therewith and an interface for interacting with the sender 104 to provide information suitable for enabling the trust-based transaction. For example, a first broker may have a kiosk installed to operate as or in conjunction with the processing server 102 for the collection of payment and recipient details associated with the recipient 106. The sender 104 may provide the processing server 102 with at least the amount being transferred for retrieval by the recipient 106. In some cases, the sender 104 may also provide a password or other data that will be used in the generation of a digital token to serve as authentication for the recipient 106.

In some cases, the password may be manually input into the processing server 102 by the sender 104 or the first broker. In other cases, the sender 104 may have a computing device, such as a cellular phone, smart phone, smart watch, wearable computing device, implantable computing device, etc., which the sender 104 may use to transmit the password or other data to the processing server 102 via any suitable transmission method (e.g., Bluetooth, near field communication, local area network, radio frequency, etc.). For example, the password may be a public key, hash value, or other data value that may be difficult for manual entry where electronic transmission may be more suitable.

In addition to providing the first broker with the transaction amount to be transferred, the sender 104 may also provide payment to the first broker. Payment may be made using any suitable format and method. For instance, the sender 104 may provide cash, a check, a credit card, debit card, or any other suitable payment instrument. In some embodiments, the first broker may be an issuing financial institution that issued a transaction account to the sender 104 that is used for payment of the transaction amount. In such embodiments, the sender 104 may provide the issuing financial institution with the transaction amount and any authentication data, where the issuing financial institution may then debit the appropriate transaction account accordingly. In embodiments where the sender 104 utilizes a computing device and the first broker is an issuing financial institution, the sender 104 may use an electronic wallet application program executed by the computing device that is associated with the issuing financial institution for selection of a transaction account and/or payment of the transaction amount to the first broker.

Following submission of the transaction amount, and any additional data, the processing server 102 may generate a digital token. The digital token may be a data value that is unique to the trust-based transaction being conducted between the sender 104 and recipient 106. The digital token may be any type of data value generated using any suitable method. For instance, the digital token may be a public key or private key of a cryptographic key pair generated using a suitable key generation algorithm, or may be a hash value generated via hashing data with a suitable hashing algorithm. For example, in cases where the sender 104 provides data to the processing server 102 for use as a security value, such as a public key or a password, the digital token may be generated via hashing the security value. In some instance, the security value may be combined with additional data, such as a nonce, for additional security.

The processing server 102 may be configured to provide the digital token to the sender 104, such as to the computing device associated with the sender 104. In some embodiments, the digital token may be electronically transmitted by the processing server 102 to the sender's computing device using any suitable method. In other embodiments, the processing server 102 may provide the data used to generate the digital token (e.g., the security value, nonce, algorithm information) to the sender's computing device, where the sender's computing device may be configured to generate the digital token independently using the provided data.

Once the sender 104 receives the digital token, the sender 104 is free to provide the digital token to the recipient 106 using any suitable method. In some embodiments, the sender 104 may provide the recipient 106 with only the security value and/or other data used to generate the digital token. In such embodiments, the recipient 106 may have their own computing device that is configured to generate a digital token based on the provided data. In such an embodiment, only users with specifically configured devices may be able to generate a digital token for presentation to a broker to receive funds. In an exemplary embodiment, the sender 104 may use a computing device to electronically transmit the digital token (e.g., or data used in the generation thereof) to the recipient 106 via a computing device thereof in an encrypted format. In such an embodiment, the recipient's computing device may possess data necessary for use in decrypting the digital token, to prohibit use of the digital token without having the proper data. For example, the recipient's computing device may generate a cryptographic key pair consisting of a private key and public key, and may provide the public key to the sender's computing device. The sender's computing device may encrypt the digital token with the recipient's public key before providing the encrypted token to the recipient 106. The recipient's computing device may decrypt the token using the private key, ensuring that only the recipient's computing device is capable of obtaining the decrypted digital token (e.g., or data used for the generation of the digital token).

While the sender 104 provides the digital token to the recipient 106, the sender broker, also referred to herein as the "first broker," may also provide the digital token to the recipient broker, also referred to herein as the "second broker." In one embodiment, the processing server 102 may electronically transmit the digital token (e.g., or data used in the generation thereof) to a recipient broker system 108 associated with the recipient broker, which may be another processing server 102 and configured to perform the functions discussed herein. In some embodiments, the digital token may be encrypted such that only the recipient broker system 108 may be able to decrypt the digital token, such as via the use of a cryptographic key pair as discussed above. In some cases, the processing server 102 may not directly provide the digital token to the recipient broker system 108, as discussed in more detail below.

To further increase the security of the trust-based system 100 and ensure that only the authorized recipient 106 may receive funds from the recipient broker, the system 100 may utilize a blockchain network 110. A blockchain network 110 may be a network comprised of a plurality of different nodes 114, where each node 114 is a computing device or system configured to generate and validate new blocks that are added to a blockchain and store the blockchain locally therein. The blockchain associated with the blockchain network 110 may be a distributed, decentralized ledger that is comprised of a plurality of different blocks. Each block in the blockchain may include at least a block header and one or more transaction data values. Each transaction data value may be related to a trust-based transaction. The block header may include at least a timestamp, a block reference value, and a transaction reference value. The timestamp may be a time at which the block header was generated, or may be a time at which the transactions associated with transaction data values included in the respective block were submitted. The block reference value may be a reference to the preceding block (e.g., based on timestamp) in the blockchain (e.g., except for the first block in the blockchain, also referred to as a genesis block, which may include a null value or arbitrary value in some cases). In an exemplary embodiment, the block reference value may be a hash value generated via the application of one or more hashing algorithms to the block header of the preceding block. The transaction reference value may be a reference to the transaction data values included in the respective block. In an exemplary embodiment, the transaction reference value may be a hash value generated via the application of one or more hashing algorithms to the transaction data values, such as the root of a Merkle tree generated using the transaction data values. The use of the reference values may ensure immutability of the blockchain, as any modification to a transaction data value would require modification to that block's transaction reference value in the block header, which would subsequently require modification to the subsequent block's block reference value in its block header, which would carry on to every following block header and have to be modified in every single node 114 in the blockchain network 110 before a new block is generated and added to the blockchain, making modification to the blockchain computationally intensive and, in many cases, impossible.

Each transaction data value in the blockchain may be related to a trust-based transaction and include at least the digital token (e.g., or data used in the generation thereof) that is unique to that transaction. In an exemplary embodiment, the digital token stored in the blockchain may be in an encrypted format, such as encrypted using a public key associated with the recipient broker system 108. In some embodiments, a transaction data value may also include the transaction amount being transferred from the sender 104 to the recipient 106. In some cases, a transaction data value may also include a blockchain address or other identifier associated with an intended recipient of the transaction data value. In such cases, the blockchain address may be associated with the recipient broker system 108. In some embodiments, blockchain addresses may be generated using a public key of a cryptographic key pair associated with a computing device (e.g., separate from cryptographic key pairs used in encryption/decryption as discussed herein). In some such embodiments, a transaction data value may also include a digital signature generated using the private key of the entity that submitted the trust-based transaction. For example, the processing server 102 may have a cryptographic key pair used for the blockchain transactions, where the public key may be used to generate addresses when the processing server 102 acts as the recipient broker and a private key used to generate digital signatures when the processing server 102 acts as the sender broker. Digital signatures may be used to ensure that the processing server 102 is genuine as the digital signature may be validated using the corresponding public key.

After the processing server 102 generates the digital token for the trust-based transaction, the processing server 102 may submit the digital token (e.g., or data used in the generation thereof), which may be encrypted, as well as any other additional data (e.g., digital signature, blockchain address, transaction amount) to a node 114 in the blockchain network. The node 114 may generate a transaction data value to include the supplied data and include the transaction data value in a new block that is generated thereby. The new block may be transmitted to other nodes 114 in the blockchain network 110 and validated thereby (e.g., to ensure the validity of digital signatures, accuracy of reference values, etc.). Once the block is validated, it may be added to the blockchain and distributed to each of the nodes 114 in the blockchain network 110. In some cases, the node 114 to which the trust-based transaction data is submitted may forward the data to a separate node 114 that may generate the new block. In some embodiments, the processing server 102 may be a node 114 in the blockchain network 110. In such embodiments, the processing server 102 may be configured to generate the transaction data value and the block header and new block in which it may be included, and may be further configured to validate new blocks being added to the blockchain.

In some embodiments, the recipient broker system 108 may be configured to receive the digital token (e.g., or data used in the generation thereof) through the blockchain. In such embodiments, the processing server 102 may not electronically transmit the digital token directly to the recipient broker system 108. Instead, the recipient broker system 108 may obtain the digital token from the blockchain, such as may be identified via the blockchain address being associated with the recipient broker system 108. In some cases, the recipient broker system 108 may be notified by the processing server 102 or blockchain network 110 of the new transaction data value that includes an address associated with the recipient broker system 108, such that the recipient broker system 108 may then identify new blocks added to the blockchain to locate digital tokens and transaction amounts for transfers intended for withdrawal from the recipient broker.

Once the recipient broker and recipient 106 each have the digital token (e.g., decrypted and generated thereby, as applicable), the recipient 106 may approach the recipient broker. The recipient 106 may provide the recipient broker (e.g., through the recipient broker system 108) with their digital token. For instance, the recipient 106 may use a computing device to electronically transmit the digital token to the recipient broker system 108 using any suitable method, such as near field communication, Bluetooth, radio frequency, etc. The recipient broker system 108 may receive the digital token and may compare it to the digital token received from the processing server 102. The recipient broker system 108 may also compare the digital token received from the recipient 106 to the digital token stored in the blockchain (e.g., if received separately from a digital token provided by the processing server 102). If the digital token provided by the recipient 106 matches the other digital token(s), then the recipient 106 may be considered to be the recipient 106 as intended by the sender 104. The recipient broker may then provide the recipient 106 with the transaction amount, as indicated by the processing server 102, sender broker, and/or blockchain.

In some embodiments, additional data regarding the intended recipient 106 may be provided by the sender 104 and included in the corresponding transaction data value that is added to the blockchain. Such additional data may be used to further verify that the recipient 106 attempting to receive the funds from the recipient broker is the recipient intended by the sender 104. For example, the sender 104 may provide additional information for the recipient 106 to provide to the recipient broker (e.g., name, date of birth, etc.) or may provide information associated with the recipient's computing device. For example, the computing device of the recipient may be associated with a device identifier (e.g., media access control address, internet protocol address, telephone number, registration number, etc.), which may be supplied to the sender 104 (e.g., or the computing device thereof) and supplied to the processing server 102 and included in the transaction data value, where the recipient's computing device may provide such data to the recipient broker system 108 for verification.

In one example, the recipient's computing device may provide its public key to the sender 104, which may be electronically transmitted to the processing server 102 with the other transaction data. The public key may be included in the transaction data value added to the blockchain and obtained by the recipient broker system 108 therefrom and/or from the processing server 102. When the recipient 106 wishes to receive funds from the recipient broker, the recipient 106 may be required to, using their computing device, generate a digital signature using the private key that corresponds to the public key that was obtained by the recipient broker system 108. The recipient broker system 108 may validate the digital signature using the public key before providing funds to the recipient 106. As a result, only a recipient 106 that presents the correct computing device (e.g., as verified via the digital signature) in addition to the proper digital token may be able to withdraw funds. Thus, even if a nefarious actor intercepts the digital token and is able to decrypt it, withdrawal of funds may still be impossible without the recipient's computing device as well.

The use of a blockchain and digital tokens may ensure that only an authorized recipient 106 may be able to receive funds from a recipient broker. The blockchain provides for immutable data storage to ensure that a digital token cannot be tampered with or adjusted, or to falsify a transaction amount or other data, while at the same time providing for an immutable and accurate record of all transfers being done between brokers. This can enable brokers to retain the honor system that has served trust-based transaction systems for centuries, while providing for more accurate accounting to ensure greater accuracy and convenience. Thus, the systems and methods discussed herein provide for greater security and convenience in trust-based transactions while retaining all of the benefits of trust-based systems through the inclusion of a blockchain and specifically configured systems configured to perform the functions discussed herein.

Processing Server

Figure 2:
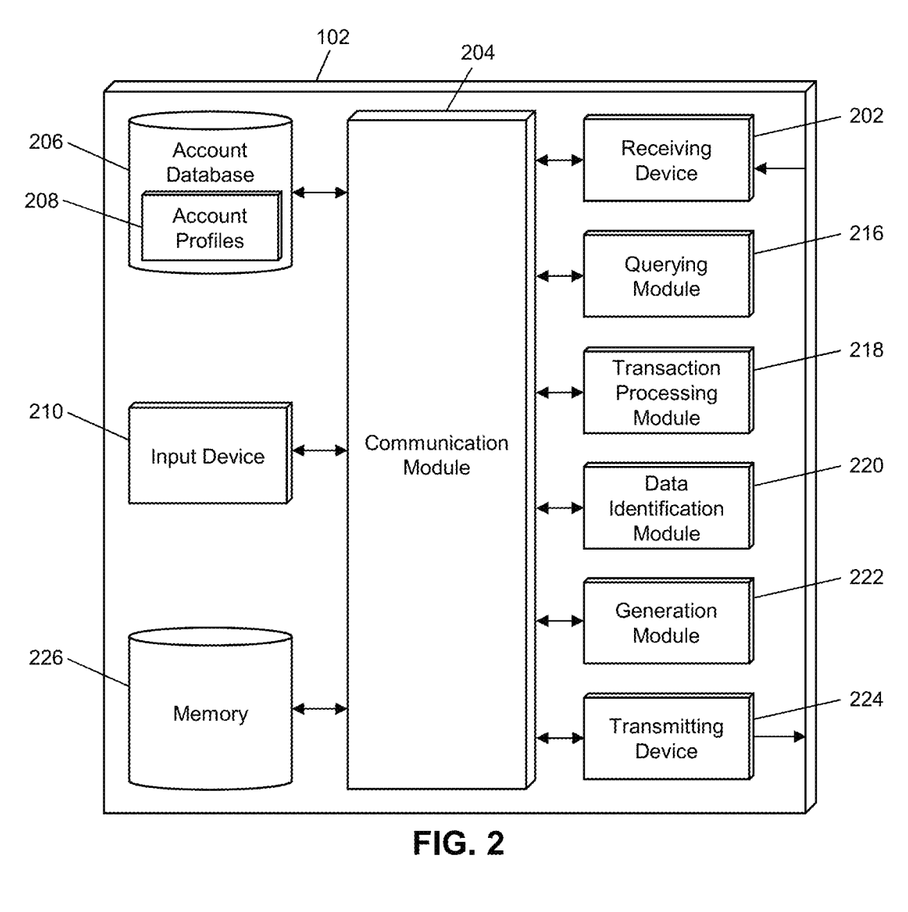
FIG. 2 is a block diagram illustrating the processing server of the system of FIG. 1 for processing trust-based transactions via blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from sender and recipient computing devices, recipient broker systems 108, other processing servers 102, nodes 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by recipient broker systems 108 that may be superimposed or otherwise encoded with public keys, including public keys used for encryption and blockchain address generation, blockchain addresses, etc. In cases where the processing server 102 is a recipient broker system 108, the receiving device 202 may be configured to receive, from other processing servers 102, data signals superimposed or otherwise encoded with digital tokens or data used in the generation thereof, transaction amounts, and any other data for a trust-based transaction, some or all of which may be encrypted. The processing server 102 may also be configured to receive data signals electronically transmitted by user computing devices, which may be superimposed or otherwise encoded with security values, digital tokens, and other trust-based transaction data. In instances where the processing server 102 may be at an issuing financial institution, such data may also include transaction account information and/or authentication information associated therewith. In embodiments where the processing server 102 is a node 114, the receiving device 202 may be configured to receive data signals from other nodes 114, which may be superimposed or otherwise encoded with blocks for verification, transaction data values, verification results for a supplied block, validated blocks, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, transaction processing module 218, data identification module 220, generation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, such as in instances where the processing server 102 may be at or a part of an issuing financial institution or otherwise associated therewith, the processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account including at least an account balance and identification data. In such embodiments, when a sender 104 wants to send money to a recipient 106, the sender 104 may provide identification data used to identify their transaction account, which may be used to identify a corresponding account profile 208, and the account balance stored therein updated accordingly based on the amount being transferred (e.g., in addition to any fees that may be paid by the sender 104).

The processing server 102 may also include or be otherwise interfaced with one or more input devices 206. The input devices 206 may be internal to the processing server 102 or external to the processing server 102 and connected thereto via one or more connections (e.g., wired or wireless) for the transmission of data to and/or from. The input devices 206 may be configured to receive input from a user of the processing server 102, such as the first broker or the sender 104, which may be provided to another module or engine of the processing server 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive input by the first broker or the sender 104 of a password or other security value, information identifying the recipient 106, the transaction amount, and other data to be used for a trust-based transaction as discussed herein.

The processing server 102 may include a querying module 216. The querying module 216 may be configured to execute queries on databases to identify information. The querying module 216 may receive one or more data values or query strings, and may execute a query string based thereon on an indicated database, such as the account database 206, to identify information stored therein. The querying module 216 may then output the identified information to an appropriate engine or module of the processing server 102 as necessary. The querying module 216 may, for example, execute a query on the account database 206 to identify an account profile 208 related to a transaction account from which a sender 104 wants to transfer funds, and to deduct the transaction amount from the account balance stored therein.

In some embodiments, the processing server 102 may also include a transaction processing module 218. The transaction processing module 218 may be configured to perform functions associated with the processing of transactions as part of the processing server 102 as discussed herein. For example, the transaction processing module 218 may be configured to authorize, approve, or deny payment transaction, deduct or credit account balances based on transfers, initiation payment transactions to a separate processing server 102 (e.g., other broker) or between transaction accounts associated therewith.

The processing server 102 may also include a data identification module 220. The data identification module 220 may be configured to identify data for use by the processing server 102 in performing the functions discussed herein. The data identification module 220 may receive instructions as input, may identify data as instructed, and may output the identified data to another module or engine of the processing server 102. The data identification module 220 may be configured to, for instance, identify blockchain addresses for recipient broker systems 108, such as may be identified based on a supplied public key or other data. In some cases, the data identification module 220 may also be configured to identify digital tokens, such as in instances where digital tokens may be pre-generated and identified for each new trust-based transaction (e.g., where the digital token may be arbitrary with respect to the security value or other data associated with the specific trust-based transaction).

The processing server 102 may also include a generation module 222. The generation module 222 may be configured to generate data for use by the processing server 102 in performing the functions discussed herein. The generation module 222 may receive instructions as input, may generate data based on the instructions, and may output the generated data to one or more modules of the processing server 102. For example, the generation module 222 may be configured to generate digital tokens using any suitable method, such as random number or value generation, hashing, key generation, etc. In some cases, the generation module 222 may be configured to use at least a security value and any other data in the generation of a digital token. In some instances, the generation module 222 may be configured to generate blockchain addresses, such as using a public key. In some embodiments, the generation module 222 may also be configured to generate a digital signature using a private key associated with the processing server 102. In embodiments where the processing server 102 may be a node 114, the generation module 222 may be configured to generate transaction data values, block reference values, transaction reference values, block headers, blocks, and other data used in the management and operation of the blockchain.

The processing server 102 may also include a transmitting device 224. The transmitting device 224 may be configured to transmit data over one or more networks via one or more network protocols. In some instances, the transmitting device 224 may be configured to transmit data to other processing servers 102, computing devices, recipient broker systems 108, nodes 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to sender computing devices, which may be superimposed or otherwise encoded with digital tokens (e.g., or data used in the generation thereof), which may, in some cases, be encrypted. The transmitting device 224 may also be configured to electronically transmit data signals to recipient broker systems 108 and nodes 114, which may be superimposed or otherwise encoded with data for a trust-based transaction, which may include a digital token (e.g., or data used in the generation thereof), transaction amount, blockchain address, public key, and any other data that may be used in the trust-based transaction, some or all of which may be encrypted in some cases.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, cryptographic key pairs, encryption/decryption algorithms, digital signature generation algorithms, hashing algorithms, communication addresses for nodes 114 and recipient broker systems 108, etc.

Process for Distribution of a Digital Token

Figure 3:
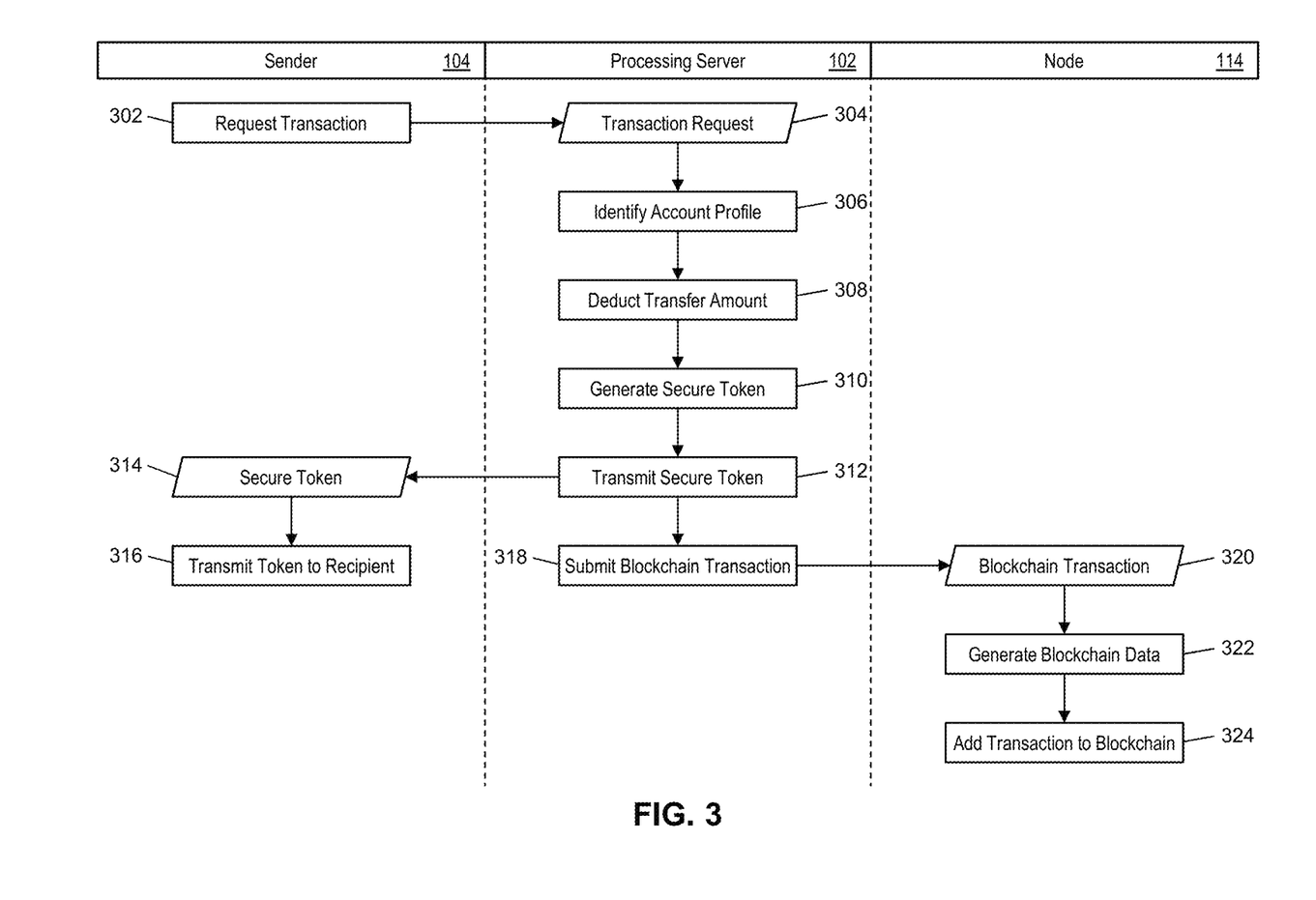
FIG. 3 is a flow diagram illustrating a process for the creation and distribution of a digital token for use in a trust-based transaction using the system of FIG. 1 in accordance with exemplary embodiments.

FIG. 3 illustrates an example process executed in the system 100 of FIG. 1 for the generation and distribution of a digital token to a sender 104 and the blockchain network 110 for use in a trust-based transaction.

In step 302, the sender 104 may request a trust-based transaction from the processing server 102 (e.g., via an input device 210 interfaced therewith, the sender's computing device, a user of the processing server 102 such as the first broker, etc.). In step 304, the receiving device 202 (e.g., or input device 210, as applicable) of the processing server 102 may receive a transaction request. The transaction request may include at least a transaction amount, and an identification value associated with the intended recipient broker. In some cases, the identification value may be a public key or blockchain address associated with the recipient broker. In other cases, the identification value may be data suitable for use in the identification of such data by the processing server 102. In some instances, the transaction request may also include a security value, and any additional data that may be used to authenticate the recipient 106 for receipt of the intended funds. In some cases, the transaction request may also include payment information, such as method of payment or, for cases where the processing server 102 is an issuing financial institution or otherwise configured to process payment transaction, payment credentials or other transaction account information.

In step 306, the querying module 216 of the processing server 102 may execute a query on the account database 206 to identify an account profile 208 stored therein that includes an account identifier included in the transaction request. In step 308, the querying module 216 may execute a query (e.g., in the same query as step 306 or a separate query) on the account database 206 to update the account balance in the identified account profile 208 to deduct the transaction amount therefrom. It will be apparent that steps 306 and 308 may only be performed in instances where the processing server 102 is configured to manage transaction accounts of senders 104 and/or recipients 106.

In step 310, the generation module 222 of the processing server 102 may generate a secure token, also referred to herein as a digital token. The generation module 222 may use any suitable method for the generation of the secure token. In cases where the transaction request includes a password or other security value, the secure token may use such a value in the generation thereof. In step 312, the transmitting device 224 of the processing server 102 may electronically transmit the secure token to the sender 104 (e.g., via a computing device associated therewith). The sender 104 may receive the secure token in step 314 and, in step 316, may transmit the token to the recipient 106 (e.g., via computing devices associated with each customer) using any suitable method. In an exemplary embodiment, the secure token may be encrypted prior to transmission to the recipient 106.

In step 318, the transmitting device 224 of the processing server 102 may electronically transmit data suitable for use in a transaction data value in the blockchain to a node 114 using any suitable method. The data may include at least the secure token, a blockchain address associated with the recipient broker system 108 (e.g., included in the transaction request or identified based on data included therein), and the transaction amount. In step 320, the node 114 may receive the data. In step 322, the node 114 may generate the transaction data value and, if applicable, a new block header and block that includes the transaction data value. In step 324, the transaction may be added to the blockchain via the validation and addition of the newly generated block, or the providing of the transaction data value to a different node 114 for inclusion in a newly generated block that is validated and added to the blockchain.

Figure 4:
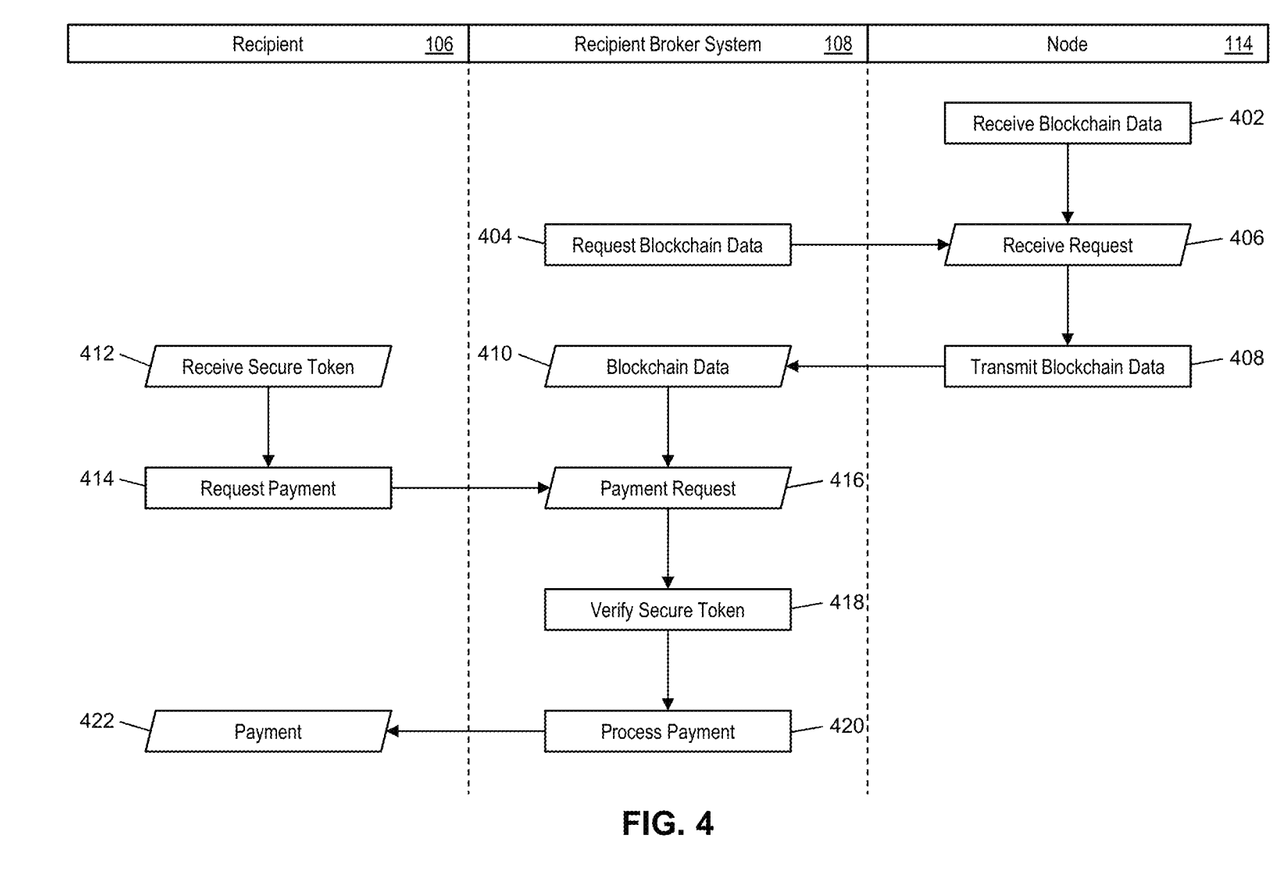
FIG. 4 is a flow diagram illustrating a process for the use of a digital token and blockchain in the processing of a trust-based payment in the system of FIG. 1 in accordance with exemplary embodiments.

Process for Completion of Trust-Based Transaction Via Digital Token and Blockchain FIG. 4 illustrates an example process executed in the system 100 of FIG. 1 for the withdrawal of funds by the recipient 106 from a recipient broker where a digital token and the blockchain network 110 is used to ensure that the recipient 106 is the proper recipient intended by the sender 104.

In step 402, a node 114 in the blockchain network 110 may receive updated blockchain data, which may include a new block that has been validated and added to the blockchain, for updating of the blockchain stored locally in the node 114. In step 404, the recipient broker system 108 may electronically transmit a request for updated blockchain data to the node 114. In step 406, the node 114 may receive the request, which may include a timestamp where the recipient broker system 108 is requesting any blocks added after that timestamp (e.g., as indicated in the respective block's block header). In step 408, the node 114 may electronically transmit any suitable blocks to the recipient broker system 108 for receipt thereby, in step 410.

In step 412, the recipient 106 (e.g., or a computing device associated therewith) may receive a secure token from the sender 104 (e.g., transmitted in step 316 in FIG. 3, discussed above). In step 414, the recipient 106 may request payment from the recipient broker system 108, which may include electronically transmitting the secure token, and any other necessary data, to the recipient broker system 108 using any suitable method. In step 416, the recipient broker system 108 may receive the payment request. In some embodiments, steps 404 through 410 may be performed after step 416. In such embodiments, the recipient broker system 108 may request only the transaction data value that includes the secure token received from the recipient 106.

In step 418, the recipient broker system 108 may verify the secure token supplied by the recipient 106. The verification may include a comparison of the secure token provided by the recipient 106 with the secure token stored in the corresponding transaction data value added to the blockchain. In cases where the sender broker provided its own secure token, the verification may further include a comparison of the secure token provided by the recipient 106 to the sender broker's secure token. If the secure token is verified (e.g., it matches the other secure tokens), then, in step 420, the recipient broker system 108 (e.g., or the recipient broker depending on payment method) may process payment of the transaction amount stored in the transaction data value to the recipient 106. In step 422, the recipient 106 may receive the payment.

Exemplary Method for Processing a Trust-Based Transaction Via Blockchain

Figure 5:
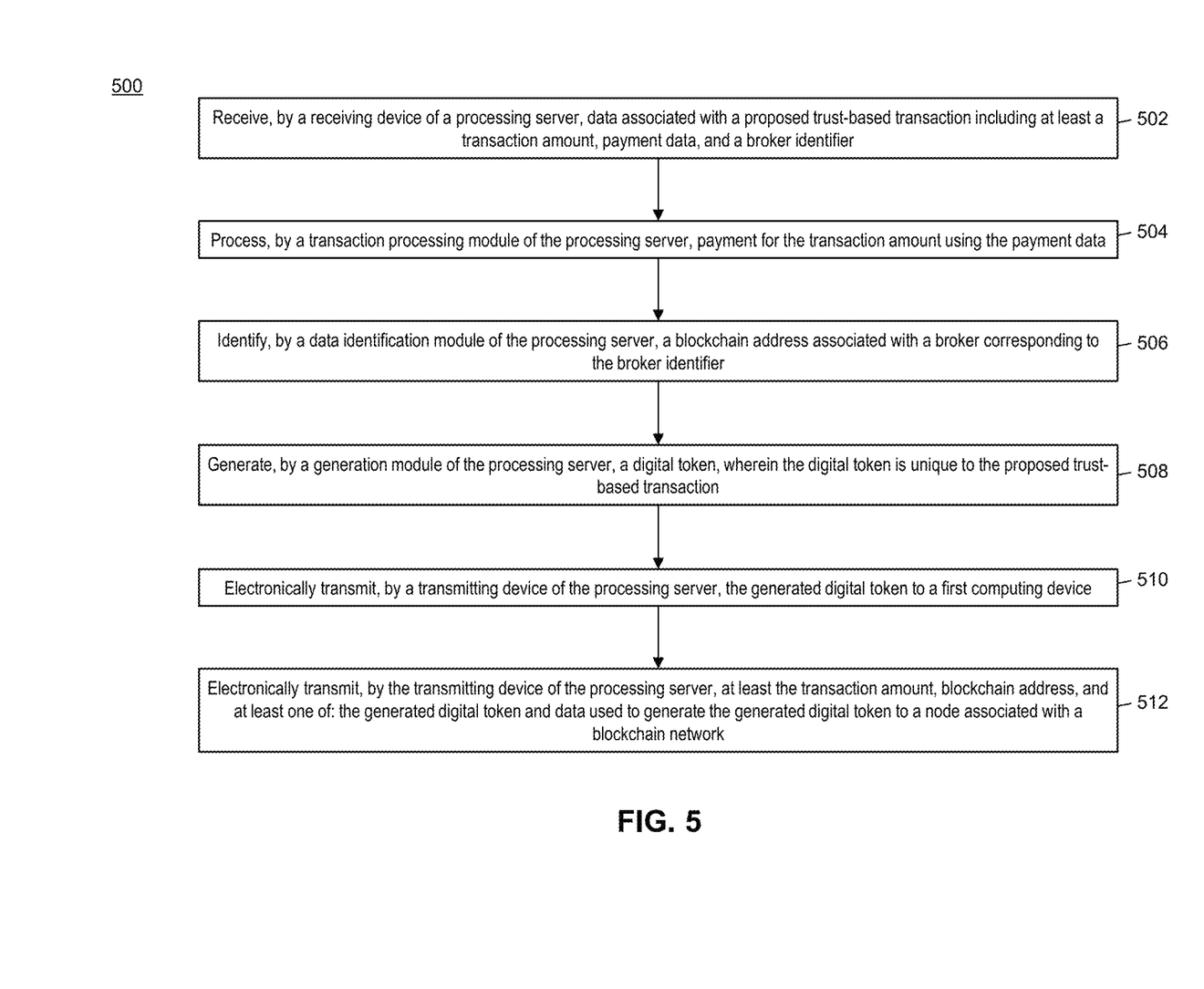
FIG. 5 is a flow chart illustrating an exemplary method for processing a trust-based transaction via a blockchain in accordance with exemplary embodiments.

FIG. 5 illustrates a method 500 for the processing of a transaction in a trust-based system aided via the use of a blockchain.

In step 502, data associated with a proposed trust-based transaction may be received by a receiving device (e.g., receiving device 202) of a processing server (e.g., the processing server 102), wherein the data includes at least a transaction amount, payment data, and a broker identifier. In step 504, payment for the transaction amount may be processed by a transaction processing module (e.g., the transaction processing module 218) of the processing server using the payment data.

In step 506, a blockchain address associated with a broker corresponding to the broker identifier may be identified by a data identification module (e.g., the data identification module 220) of the processing server. In step 508, a digital token may be generated by a generation module (e.g., the generation module 222) of the processing server, wherein the digital token is unique to the proposed trust-based transaction.

In step 510, the generated digital token may be electronically transmitted by a transmitting device (e.g., the transmitting device 224) of the processing server to a first computing device. In step 512, at least the transaction amount, blockchain address, and at least one of: the generated digital token and data used to generate the generated digital token may be electronically transmitted by the transmitting device of the processing server to a node (e.g., node 114) associated with a blockchain network (e.g., the blockchain network 110).

In one embodiment, the node associated with the blockchain network may be the processing server, and the generation module of the processing server may be configured to generate a new blockchain transaction based on at least the transaction amount, blockchain address, and one of: the generated digital token and the data used to generate the generated digital token. In some embodiments, the data associated with the proposed trust-based transaction may further include a password, and the digital token may be generated using at least the password. In a further embodiment, the data used to generate the generated digital token may be the password.

In one embodiment, the data associated with the proposed trust-based transaction may be received from the first computing device via an electronic transmission. In some embodiments, the data associated with the proposed trust-based transaction may be received from an input device interfaced with the processing server. In one embodiment, the payment data may include at least a primary account number, and processing the payment for the transaction may include electronically transmitting, by the transmitting device of the processing server, a transaction message including at least the primary account number and transaction amount for a payment transaction to a payment network, and receiving, by the receiving device of the processing server, an authorization response for the payment transaction indicating approval of the payment transaction. In some embodiments, the method 500 may further include storing, in an account database (e.g., the account database 206) of the processing server, a plurality of account profiles (e.g., account profiles 208), wherein each account profile includes a structured data set related to a transaction account including at least an account identifier and a current balance, wherein processing the payment for the transaction includes executing, by a querying module (e.g., the querying module 216) of the processing server, a query on the account database to update the current balance based on the transaction amount in a specific account profile where the included account identifier is included in the payment data included In the received data associated with the proposed trust-based transaction.

Computer System Architecture

Figure 6:
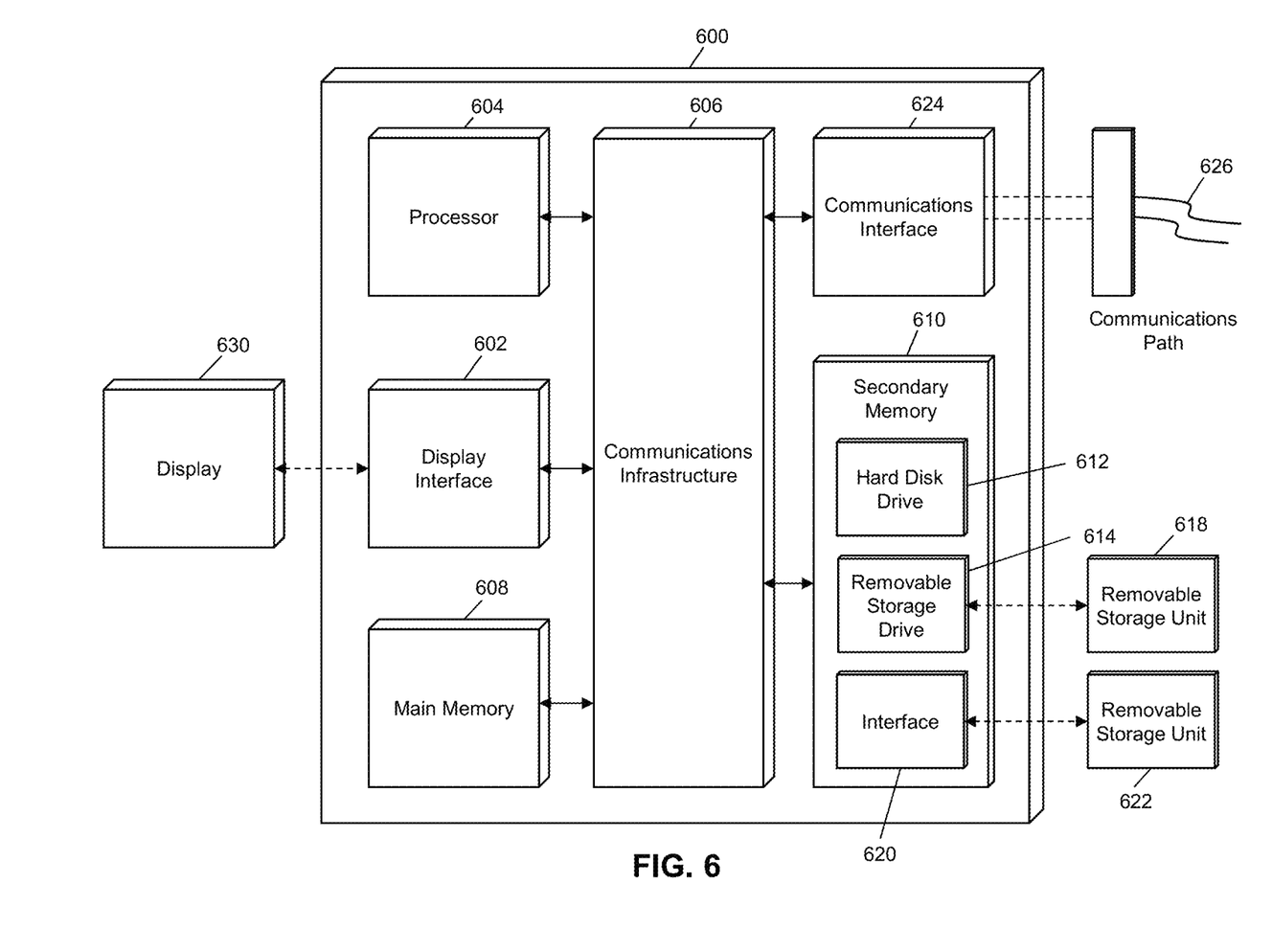
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for processing trust-based transactions via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a trust-based transaction via a blockchain, comprising:
   receiving, by a processing server, data associated with a trust-based transaction from a sender, the data associated with the trust-based transaction including at least a transaction amount, payment data, and a recipient broker identifier;
   processing, by the processing server, payment for the transaction amount using the payment data;
   identifying, by the processing server, a blockchain address associated with a recipient broker corresponding to the recipient broker identifier;
   generating, by the processing server, a digital token, wherein the digital token is unique to the trust-based transaction;
   electronically transmitting, by the processing server, at least one of: the generated digital token and data used to generate the generated digital token to a computing device of the sender;
   electronically transmitting, by the processing server, at least the transaction amount, the blockchain address associated with the recipient broker, and at least one of:

the generated digital token and the data used to generate the generated digital token to a node associated with a blockchain network;

electronically transmitting, by the processing server, a new transaction data value to the recipient broker, the new transaction data value including the blockchain address associated with the recipient broker and providing the recipient broker with notification of the generated digital token and the transaction amount intended for withdrawal from the recipient broker;

receiving, on the processing server, a request from the recipient broker for the generated digital token on the node associated with the blockchain network based on the electronically transmitted notification to the recipient broker of the new transaction data value that includes the blockchain address associated with the recipient broker;

electronically transmitting, by the processing server, the generated digital token from the node associated with the blockchain network;

receiving, by the recipient broker, the generated digital token from the node associated with the blockchain network;

receiving, by the recipient broker, a request for the payment for the transaction amount from a computing device of a recipient, the request for the payment for the transaction amount including the generated digital token;

verifying, by the recipient broker, the generated digital token received from the computing device of the recipient with the generated digital token received from the node associated with the blockchain network; and processing, by the recipient broker, the payment for the transaction amount for the recipient upon the generated digital token received from the computing device of the recipient being verified with the generated digital token received from the node associated with the blockchain network.

2. The method of claim 1, wherein
the processing server is a node associated with the blockchain network, and
the processing server is configured to generate a new blockchain transaction based on at least the transaction amount, the blockchain address associated with the recipient broker, and one of: the generated digital token and the data used to generate the generated digital token.

3. The method of claim 1, wherein
the data associated with the trust-based transaction further includes a password, and
the digital token is generated using at least the password.

4. The method of claim 3, wherein the data used to generate the generated digital token is the password.

5. The method of claim 1, further comprising:
receiving the data associated with the trust-based transaction from a computing device of a sender via an electronic transmission.

6. The method of claim 5, wherein the computing device of the sender is a computing device configured to collect payment and recipient details.

7. The method of claim 1, further comprising:
receiving the data associated with the trust-based transaction from an input device interfaced with the processing server.

8. The method of claim 1, wherein
the payment data includes at least a primary account number, and
processing the payment for the transaction includes electronically transmitting, by the processing server, a transaction message including at least the primary account number and transaction amount for a payment transaction to a payment network, and receiving, by the receiving device of the processing server, an authorization response for the payment transaction indicating approval of the payment transaction.

9. The method of claim 1, further comprising:
storing, in an account database of the processing server, a plurality of account profiles, wherein each account profile includes a structured data set related to a transaction account including at least an account identifier and a current balance, wherein
processing the payment for the transaction includes executing, by the processing server, a query on the account database to update the current balance based on the transaction amount in a specific account profile where the included account identifier is included in the payment data included in the received data associated with the trust-based transaction.

10. The method of claim 1, further comprising:
receiving, by a computing device of a recipient, at least one of: the generated digital token and the data used to generate the generated digital token from the computing device of the sender;
generating, by the computing device of the sender, a copy of the generated digital token using the data used to generate the generated digital token;
sending, by the computing device of the sender, the copy of the generated digital token to the computing device of the recipient; and
verifying, by the recipient broker, the copy of the generated digital token received from the computing device of the recipient with the generated digital token received from the node associated with the blockchain network.

11. The method of claim 1, further comprising:
receiving, by a computing device of a recipient, at least one of: the generated digital token and the data used to generate the generated digital token from the computing device of the sender;
sending, by the computing device of the sender, the data used to generate the generated digital token to the computing device of the recipient;
generating, by the computing device of the recipient, a copy of the generated digital token using the data used to generate the generated digital token; and
verifying, by the recipient broker, the copy of the generated digital token received from the computing device of the recipient with the generated digital token received from the node associated with the blockchain network.

12. A system for processing a trust-based transaction via a blockchain, comprising:
a first processing server configured to receive data associated with a trust-based transaction from a sender, the data associated with the trust-based transaction including at least a transaction amount, payment data, and a recipient broker identifier;
the first processing server configured to:
process payment for the transaction amount using the payment data;
identify a blockchain address associated with a recipient broker corresponding to the recipient broker identifier, the blockchain address associated with the recipient broker configured to allow the recipient broker to locate digital tokens and transaction amounts for transfers intended for withdrawal from the recipient broker;

generate a digital token, wherein the digital token is unique to the trust-based transaction;

electronically transmit at least one of: the generated digital token and data used to generate the generated digital token to a computing device of the sender; and electronically transmit at least the transaction amount, the blockchain address associated with the recipient broker, and at least one of: the generated digital token and the data used to generate the generated digital token to a node associated with a blockchain network;

electronically transmit a new transaction data value to the recipient broker, the new transaction data value including the blockchain address associated with the recipient broker and providing the recipient broker with notification of the generated digital token and the transaction amount intended for withdrawal from the recipient broker:

receive a request from the recipient broker for the generated digital token on the node associated with the blockchain network based on the electronically transmitted notification to the recipient broker of the new transaction data value that includes the blockchain address associated with the recipient broker;

electronically transmit the generated digital token from the node associated with the blockchain network; and a second processing server associated with the recipient broker, the second processing server configured to:

receive the generated digital token from the node associated with the blockchain network;

receive a request for the payment for the transaction amount from a computing device of a recipient, the request for the payment for the transaction amount including the generated digital token;

verify the generated digital token received from the computing device of the recipient with the generated digital token received from the node associated with the blockchain network; and process the payment for the transaction amount for the recipient upon the generated digital token received from the computing device of the recipient being verified with the generated digital token received from the node associated with the blockchain.

13. The system of claim 12, wherein
the first processing server is a node associated with the blockchain network, and
the first processing server is configured to generate a new blockchain transaction based on at least the transaction amount, the blockchain address associated with the recipient broker, and one of: the generated digital token and the data used to generate the generated digital token.

14. The system of claim 12, wherein
the data associated with the trust-based transaction further includes a password, and
the digital token is generated using at least the password.

15. The system of claim 14, wherein the data used to generate the generated digital token is the password.

16. The system of claim 12, wherein the data associated with the trust-based transaction is received from the computing device of the sender via an electronic transmission.

17. The system of claim 16, wherein the computing device of the sender is a computing device configured to collect payment and recipient details.

18. The system of claim 12, wherein the data associated with the trust-based transaction is received from an input device interfaced with the first processing server.

19. The system of claim 12, wherein
the payment data includes at least a primary account number, and
processing the payment for the transaction includes electronically transmitting, by the first processing server, a transaction message including at least the primary account number and transaction amount for a payment transaction to a payment network, and receiving, by the first processing server, an authorization response for the payment transaction indicating approval of the payment transaction.

20. The system of claim 12, further comprising:
an account database of the first processing server configured to store a plurality of account profiles, wherein each account profile includes a structured data set related to a transaction account including at least an account identifier and a current balance, wherein
processing the payment for the transaction includes executing, by the first processing server, a query on the account database to update the current balance based on the transaction amount in a specific account profile where the included account identifier is included in the payment data included in the received data associated with the trust-based transaction.

* * * * *